(12) United States Patent
Ishikawa et al.

(10) Patent No.: US 8,596,401 B2
(45) Date of Patent: Dec. 3, 2013

(54) ELECTRIC MOTORCYCLE

(75) Inventors: Jun Ishikawa, Wako (JP); Hiroyuki Nishimori, Wako (JP); Takeo Nakazawa, Wako (JP); Akira Tokito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/616,074

(22) Filed: Sep. 14, 2012

(65) Prior Publication Data

US 2013/0081894 A1 Apr. 4, 2013

(30) Foreign Application Priority Data

Sep. 29, 2011 (JP) ................................ 2011-214489

(51) Int. Cl.
*B62D 61/02* (2006.01)

(52) U.S. Cl.
USPC ......................................... 180/220; 180/65.1

(58) Field of Classification Search
USPC ................ 180/220, 205.1, 206.1, 206.2, 65.1
See application file for complete search history.

(56) References Cited

U.S. PATENT DOCUMENTS

| 5,313,191 A * | 5/1994 | Yamashita et al. ............ 340/439 |
| 5,406,154 A * | 4/1995 | Kawaguchi et al. ......... 310/67 R |
| 5,657,830 A * | 8/1997 | Kawashima et al. ......... 180/220 |
| 7,145,261 B2 * | 12/2006 | Kojima et al. .............. 290/40 C |
| 7,392,870 B2 * | 7/2008 | Kojima et al. ............. 180/65.25 |
| 7,617,894 B2 * | 11/2009 | Ozeki et al. ................ 180/65.21 |
| 2012/0000720 A1 * | 1/2012 | Honda et al. ................. 180/65.1 |

FOREIGN PATENT DOCUMENTS

JP 2988993 10/1999

* cited by examiner

*Primary Examiner* — Tony Winner
(74) *Attorney, Agent, or Firm* — Rankin, Hill & Clark LLP

(57) ABSTRACT

In a electric motorcycle including a power unit having a motor whose revolving shaft is oriented in the vehicle width direction, and a centrifugal clutch configured to transmit a rotary drive force of the motor to an output shaft, the centrifugal clutch is arrange coaxially with the motor. A primary driven gear arranged coaxially with the output shaft and configured to transmit a drive force transmitted from the centrifugal clutch to the output shaft is provided. The primary driven gear is arranged so as to be interposed between the centrifugal clutch and the motor in the axial direction of the revolving shaft. A clutch outer is fixed to a clutch outer holder which is relatively rotatable with respect to the revolving shaft, and the primary driven gear is engaged with a primary drive gear formed on the outer periphery of the clutch outer holder.

12 Claims, 9 Drawing Sheets

ELECTRIC MOTORCYCLE

BACKGROUND OF THE INVENTION

1. Field of the Invention

The present invention relates to an electric motorcycle and, more specifically, to an electric motorcycle configured to travel by driving a motor with power supplied from a battery.

2. Description of Related Art

In the related art, the electric motorcycle including a motor-integrated power unit mounted on a vehicle body frame, and configured to travel by transmitting a rotary drive force of the motor to a drive wheel is known.

For example, in Japanese Patent No. 2988993 an electric motorcycle including a rear wheel as a drive wheel is mounted at a rear end of a swing arm axially supported by the vehicle body frame so as to be swingable, and is configured to transmit a rotary drive force of a motor in a power unit to the rear wheel via a chain-drive mechanism. Stored in the interior of the power unit are the motor as a power source, a continuously variable transmission having a V-belt entrained about a drive pulley and a driven pulley, and a centrifugal clutch configured to be switched to a connected state when the revolving speed of the motor exceeds a predetermined rotation.

The power unit described in Japanese Patent No. 2988993 has a structure in which the motor is disposed at a coaxial position with the drive pulley, and the centrifugal clutch is disposed at a coaxial position with the driven pulley. In this structure, the motor and the centrifugal clutch are disposed in the fore-and-aft direction of the vehicle, and hence the dimension of the power unit in the vehicle width direction is reduced. However, since the motor and the centrifugal clutch are arranged in the fore-and-aft direction of the vehicle, there arises a problem that the length in the fore-and-aft direction tends to increase.

SUMMARY OF THE INVENTION

It is an object of the present invention to provide an electric motorcycle including a power unit optimized in layout of a motor, a centrifugal clutch and the like.

In order to achieve the above-described object, there is provided an electric motorcycle including: a power unit including a motor whose revolving shaft is oriented in the vehicle width direction and a centrifugal clutch configured to transmit a rotary drive force of the motor to an output shaft provided in parallel to the revolving shaft. The centrifugal clutch is coaxially arranged with the motor, and includes a primary driven gear arranged coaxially with the output shaft and is configured to transmit a drive force transmitted from the centrifugal clutch to the output shaft, and the primary driven gear is disposed so as to be interposed between the centrifugal clutch and the motor in the axial direction of the revolving shaft. Therefore, the primary driven gear can be disposed by effectively using a space between the centrifugal clutch and the motor, and hence the dimension of the power unit in the vehicle width direction can be significantly reduced.

In further accordance with the present invention, a clutch plate configured to hold a clutch shoe of the centrifugal clutch is fixed to one end portion of the revolving shaft, a bottomed cylindrical shaped clutch outer that constitutes the centrifugal clutch is disposed at a position closer to the motor with respect to the clutch plate, the clutch outer is fixed to a clutch outer holder, which is relatively rotatable with respect to the revolving shaft, and the primary driven gear engages a primary drive gear formed on an outer peripheral portion of the clutch outer holder. Therefore, the power unit and a power transmitting system can be configured with a simple configuration.

In further accordance with the present invention, the primary driven gear is arranged so as to overlap with the centrifugal clutch in side view of the vehicle so that an outline thereof comes close to the revolving shaft. Hence, the revolving shaft and the output shaft may be arranged in proximity and the power unit can be downsized.

In further accordance with the present invention, the output shaft is disposed so that one end portion thereof projects outward of the vehicle from the power unit on the back side of the centrifugal clutch with respect to the vehicle body, and a drive sprocket on which a drive chain is to be wound is fixed to the one end portion of the output shaft. Therefore, the power transmission from the power unit to the drive wheel can be achieved with a simple configuration.

In further accordance with the present invention, the output shaft is supported by two bearings disposed apart from each other, and the bearing on the side proximity to the drive sprocket, which is one of the two bearings, is disposed radially outward of the centrifugal clutch. Therefore, while avoiding interference between the centrifugal clutch and the drive sprocket, the drive sprocket can be put inward toward the center side of the case and hence the dimension of the power unit in the vehicle width direction can be reduced.

In further accordance with the present invention, the primary drive gear and the primary driven gear are disposed on a vehicle body centerline of the electric motorcycle. As a result, the weight balance of the power unit in the vehicle width direction can easily be kept and proper weight balance in the vehicle width direction of the electric motorcycle can easily be ensured.

In further accordance with the present invention, a power unit has a configuration in which a clutch case is mounted on one side of a case in the vehicle width direction, a motor cover is mounted on the other side, the revolving shaft is supported by a bearing fitted to the case and a bearing fitted to the motor cover, and the output shaft is supported by the bearing fitted to the case and the bearing fitted to the clutch case. Therefore, the power unit which supports the two axes efficiently using a plurality of the cases and the cover member is achieved.

BRIEF DESCRIPTION OF THE DRAWINGS

These and further features of the invention will be apparent from the following description and drawings, wherein.

DETAILED DESCRIPTION OF THE PREFERRED EMBODIMENTS

Figure 1:
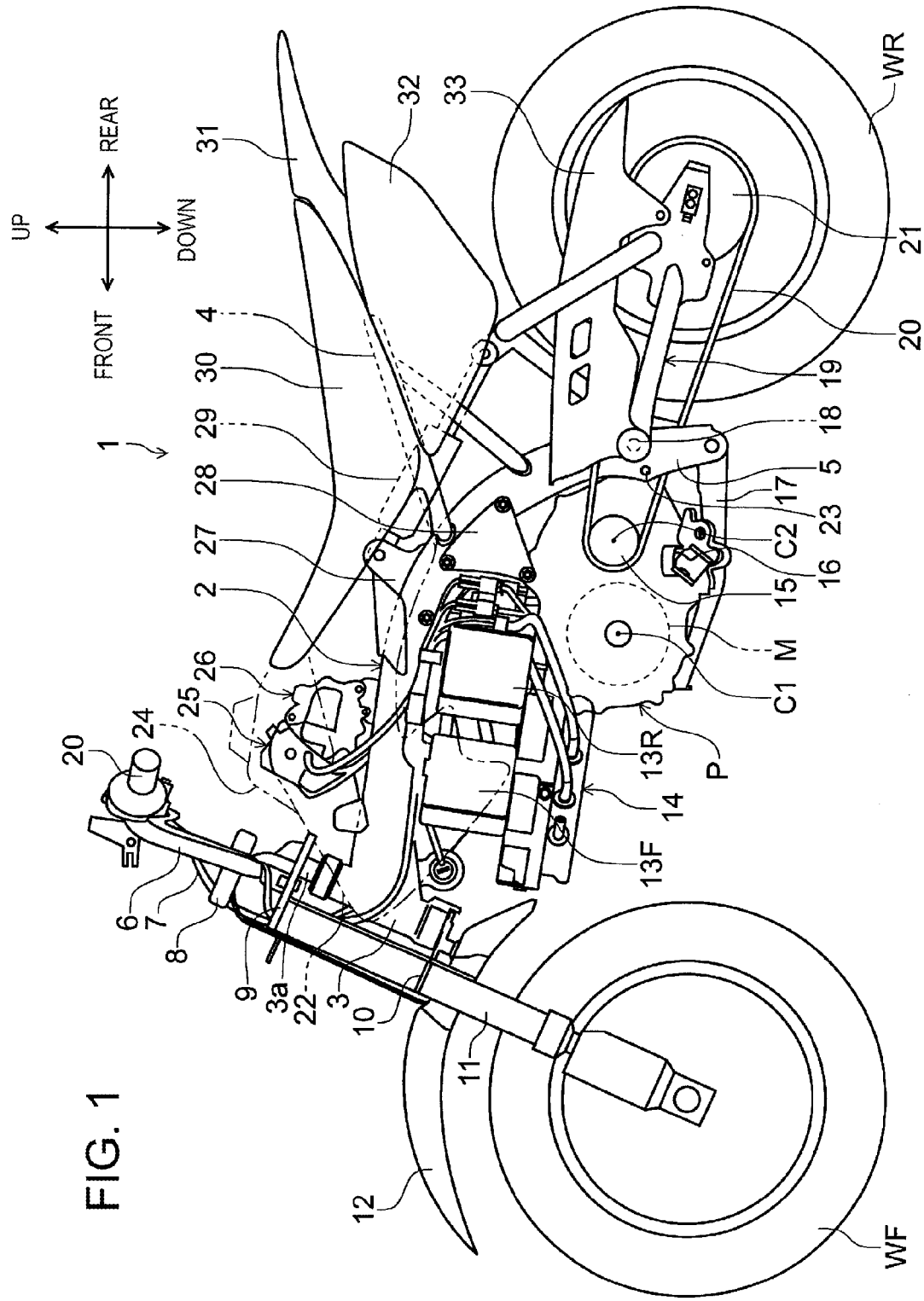
FIG. 1 is a left side view of an electric motorcycle.
Figure 2:
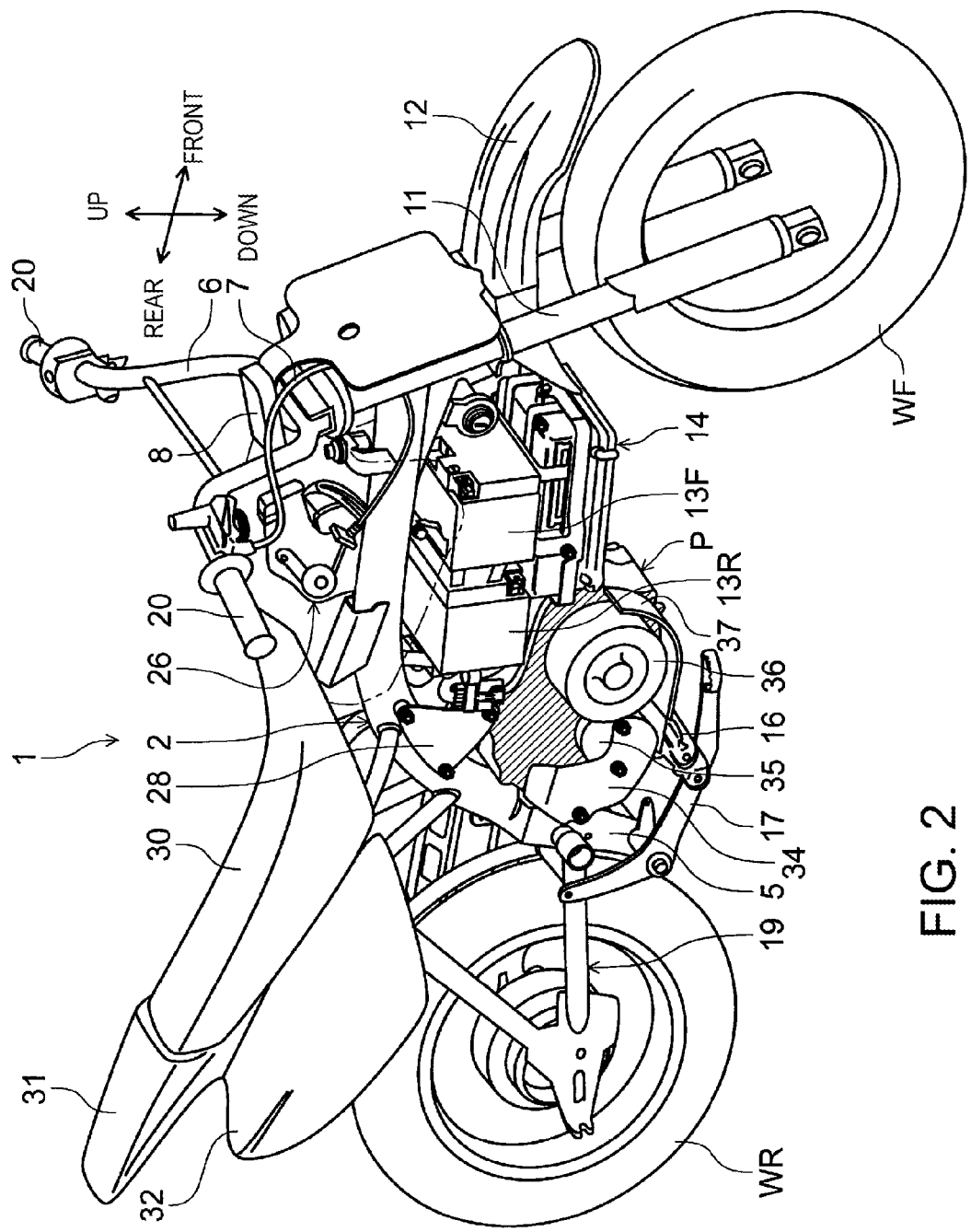
FIG. 2 is a perspective view of the electric motorcycle.

Referring now to the drawings, preferred embodiments of the invention will be described. FIG. 1 is a left side view of an electric motorcycle 1 according to an embodiment of the present invention. FIG. 2 is a perspective view of the electric motorcycle 1. The electric motorcycle 1 has a configuration in which a power unit P including a motor M, a decelerating mechanism and the like is mounted on a vehicle body frame 2, and a rotary drive force generated by the power unit P is transmitted to a rear wheel WR via a chain-drive mechanism.

A head pipe 3 configured to axially support a stem shaft 3*a* so as to be rotatable is coupled to a front end of the vehicle body frame 2 of the electric motorcycle 1. A sheet frame 4 is coupled to the vehicle body frame 2 extending rearward from the head pipe 3 at a portion curved downward of the vehicle body, and left and right pivot plates 5 are coupled to the lower side thereof. A pivot shaft 18 configured to axially support a swing arm 19 so as to be swingable is mounted on the pivot plates 5.

Left and right front forks 11 are configured to axially support a front wheel WF so as to be rotatable are supported by a top bridge 9 and an under bracket 10 fixed to the top and the bottom of the stem shaft 3*a*. An up-type handle 6 is fixed to an upper portion of the top bridge 9, and a front fender 12 is fixed to a lower portion of the under bracket 10.

Handle grips 20, which are gripped by a rider are mounted on both end portions of the handle 6 fixed to an upper surface of the top bridge 9 at a center in the vehicle width direction. The throttle grip 20 on the right side in the vehicle width direction is a rotary throttle input unit, and the rotating action thereof is transmitted to a throttle opening sensor 26 on an upper portion of the vehicle body frame 2 via a throttle cable 7. A display device 8 having a GPS function or the like is mounted on the handle 6 at the center in the vehicle width direction.

The power unit P is supported by the vehicle body frame 2 via a supporting portion 23 in the vicinity of the pivot shaft 18 and left and right hanger plates 28. A drive sprocket 15 fixed to an output shaft 80 (see FIG. 7) is disposed on the left side of the power unit P in the vehicle width direction, and the rotary drive force of the motor M is transmitted to a driven sprocket 21 of the rear wheel WR via a drive chain 20 wound around the drive sprocket 15.

A chain cover 33 configured to cover an upper portion of the drive chain 20 is mounted on the swing arm 19. The swing arm 19 is axially supported on the vehicle body frame 2 so as to be swingable by the pivot shaft 18 of the pivot plates 5, and is suspended from a mounting portion 27 of the vehicle body frame 2 via a rear cushion 29. A rear brake pedal 17 is mounted on the pivot plates 5 on the right side in the vehicle width direction.

Disposed on the front upper side of the power unit P with respect to the vehicle body and on the lower portion of the vehicle body frame 2 are batteries 13F, 13R configured to supply power to the power unit P and a PDU (Power Delivery Unit) 14 as a control unit for supply power. The front battery 13F and the rear battery 13R having the same shape are arranged in proximity to the lower portion of the vehicle body frame 2, aligned one behind another. The PDU 14 is substantially a rectangular parallelepiped having a dimension smaller than the batteries 13F, 13R in the vertical direction of the vehicle body and dimensions in the fore-and-aft direction and the vehicle width direction larger than the batteries 13F, 13R, and is arranged in proximity to lower portions of the batteries 13F, 13R on the front side of the power unit P.

The rear frame 4 is covered with a seat 30, a rear fender 31, and a rear cover 32. An upper cover 24 configured to cover the throttle opening sensor 26 and an electrical component 25 is disposed on the front side of the seat 30 with respect to the vehicle body, and a pair of left and right side covers 22 are disposed on the sides of the vehicle body frame 2 and the front battery 13F.

In the power unit P, a rotational center C1 of the motor M and a rotational center C2 of the drive sprocket 15 are disposed so as to be substantially horizontal in the fore-and-aft direction of the vehicle. A bottomed cylindrical shaped motor cover 36 configured to cover the motor M projecting rightward in the vehicle width direction, a curved plate-shaped motor guard 37 disposed from the front side to the lower side of the motor cover 36 with respect to the vehicle body, and a plate-shaped heal guard 34 supported by a supporting base 35 on the back side of the motor cover 36 with respect to the vehicle body are disposed in the power unit P on the right side in the vehicle width direction. The electric motorcycle 1 according to the invention is configured to protect the motor M by three protecting members including the motor cover 36, the motor guard 37, and the heal guard 34. A footrest step 16 having a right portion and a left portion integrally formed to each other and configured to be mounted on a lower surface PB (see FIG. 8) of the power unit P also has a function to protect the lower surface.

Figure 3:
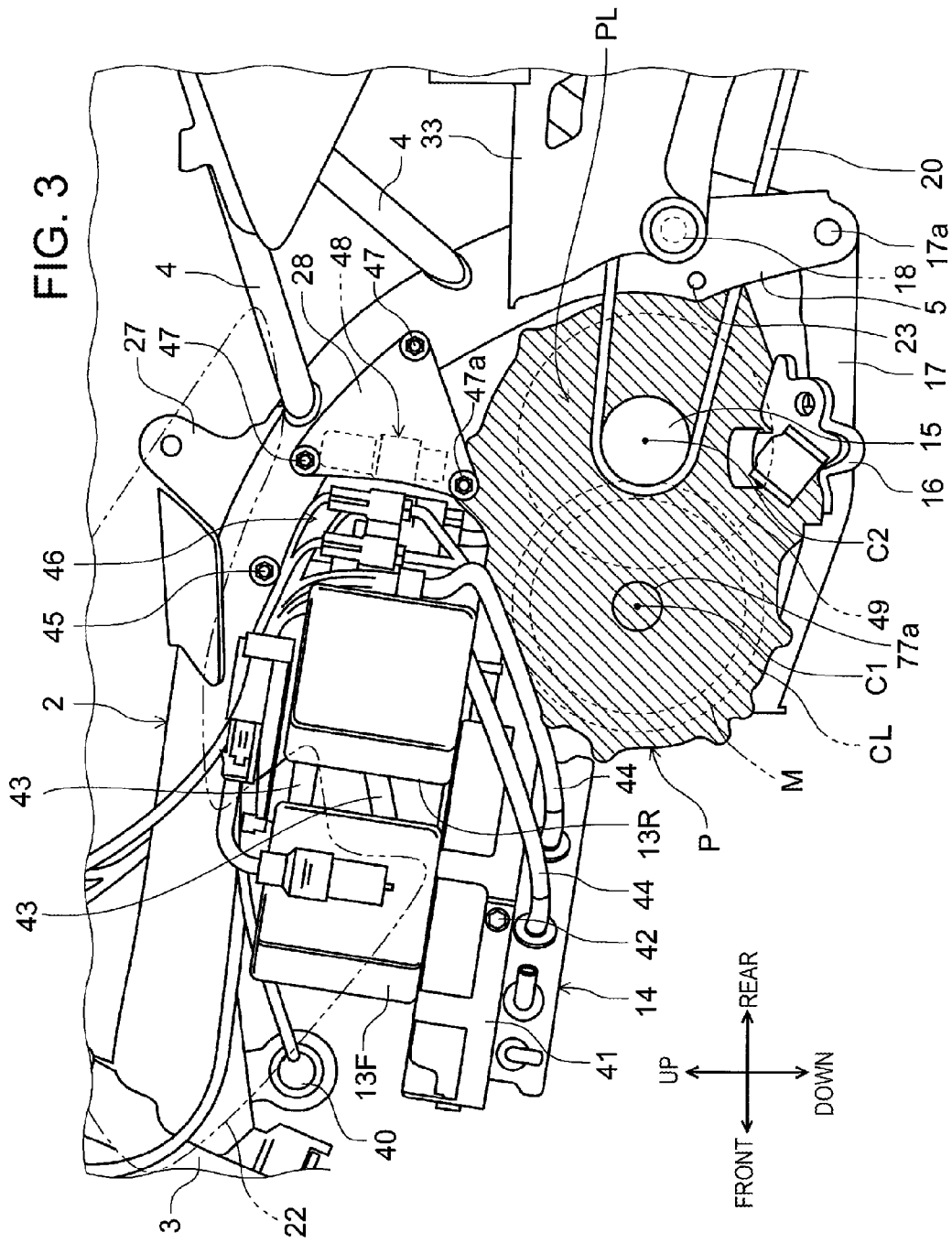
FIG. 3 is a partly enlarged left side view of the electric motorcycle.

FIG. 3 is a partly enlarged left side view of the electric motorcycle 1. As described above, the power unit P is supported on the vehicle body frame 2 by the supporting portion 23 in proximity to the pivot shaft 18 and the hanger plates 28 provided on the upper side thereof. The hanger plates 28, which have a substantially triangular shape, are fixed to the vehicle body frame 2 with two bolts 47 and, on the other hand, are fixed to an upper portion of the power unit P by a bolt 47*a*.

The batteries 13F, 13R are held by a battery stay 43 fixed to the vehicle body frame 2 by a mounting screw 45. The PDU 14 is held by a PDU stay 41 fixed to a lower portion of the battery stay 43 with a mounting screw 42. In a space formed between the front battery 13F and the hanger plates 28, high-voltage lines 44 connecting between the front battery 13F and the PDU 14 and between the PDU 14 and the power unit P are laid and a connector 46 connecting the respective lines, a fuse 48, and the like are disposed therein. In the embodiment, since the front and rear batteries 13F, 13R, the PDU 14, and the power unit P are arranged in proximity to each other, concentration of the mass of the electric motorcycle 1 is achieved, and reduction in length of the high-voltage lines connecting respective components is achieved to improve the transmitting efficiency.

The power unit P includes a centrifugal clutch CL arranged coaxially with the motor M and a large-diameter primary driven gear 49 arranged coaxially with the drive sprocket 15. The rotary drive force of the motor M is transmitted to the drive chain 20 via the centrifugal clutch CL and through the primary driven gear 49 to the drive sprocket 15. A left side surface PL (a hatched portion in the drawing) of the power unit P is substantially flat surface, and only a small projecting portion 77*a* around the rotational center C1 and the drive sprocket 15 project leftward in the vehicle width direction from the left side surface.

An ignition switch 40 is provided on a lower surface of the vehicle body frame 2 in the front of the front battery 13F. The rear brake pedal 17 is mounted so as to be swingable by a supporting shaft 17*a* provided on the pivot plate 5 on the right side in the vehicle width direction.

Figure 4:
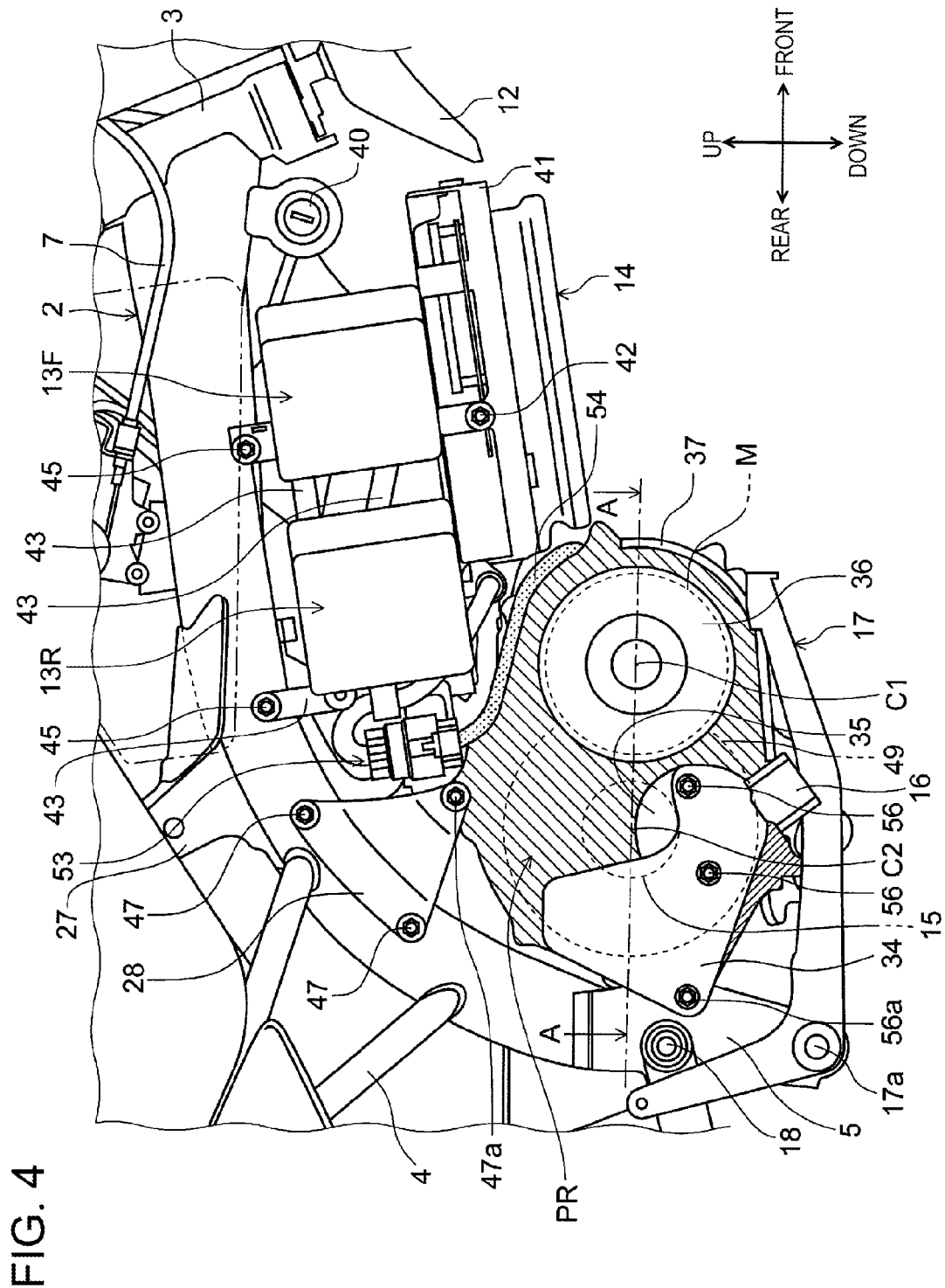
FIG. 4 is a partly enlarged right side view of the electric motorcycle.

FIG. 4 is a partly enlarged right side view of the electric motorcycle 1. The same reference numerals designate the same or equivalent components. Connected to a lower portion of a connector 53 provided between the rear battery 13R and the hanger plates 28 is a high-voltage line 54 guided into the interior of the power unit P so as to supply power to the motor M. The high-voltage line 54 is inserted into the interior of the power unit P on the front upper side of the power unit P with respect to the vehicle body and between the power unit and the PDU 14. In other words, the high-voltage line 54 supplying power from the PDU 14 to the motor M extends from the PDU 14, passes the lower side and the rear side of the batteries 13F, 13R and is laid to the front upper side of a case 50 with respect to the vehicle body, whereby the high-voltage line 54 is disposed between the batteries 13F, 13R and the power unit P and hence the high-voltage line 54 can be protected from a disturbance.

Although a right side surface PR (a hatched portion in the drawing) as one side surface of the power unit P is a substantially flat surface, the motor cover 36 covering the motor M and the substantially cylindrical supporting base 35 configured to support the heal guard 34 project rightward significantly in the vehicle width direction from the right side surface PR. The heal guard 34 is fixed to the supporting base 35 with two mounting screws 56 and is fixed to the pivot plate 5 by a mounting screw 56a on the back side of the vehicle body.

Figure 5:
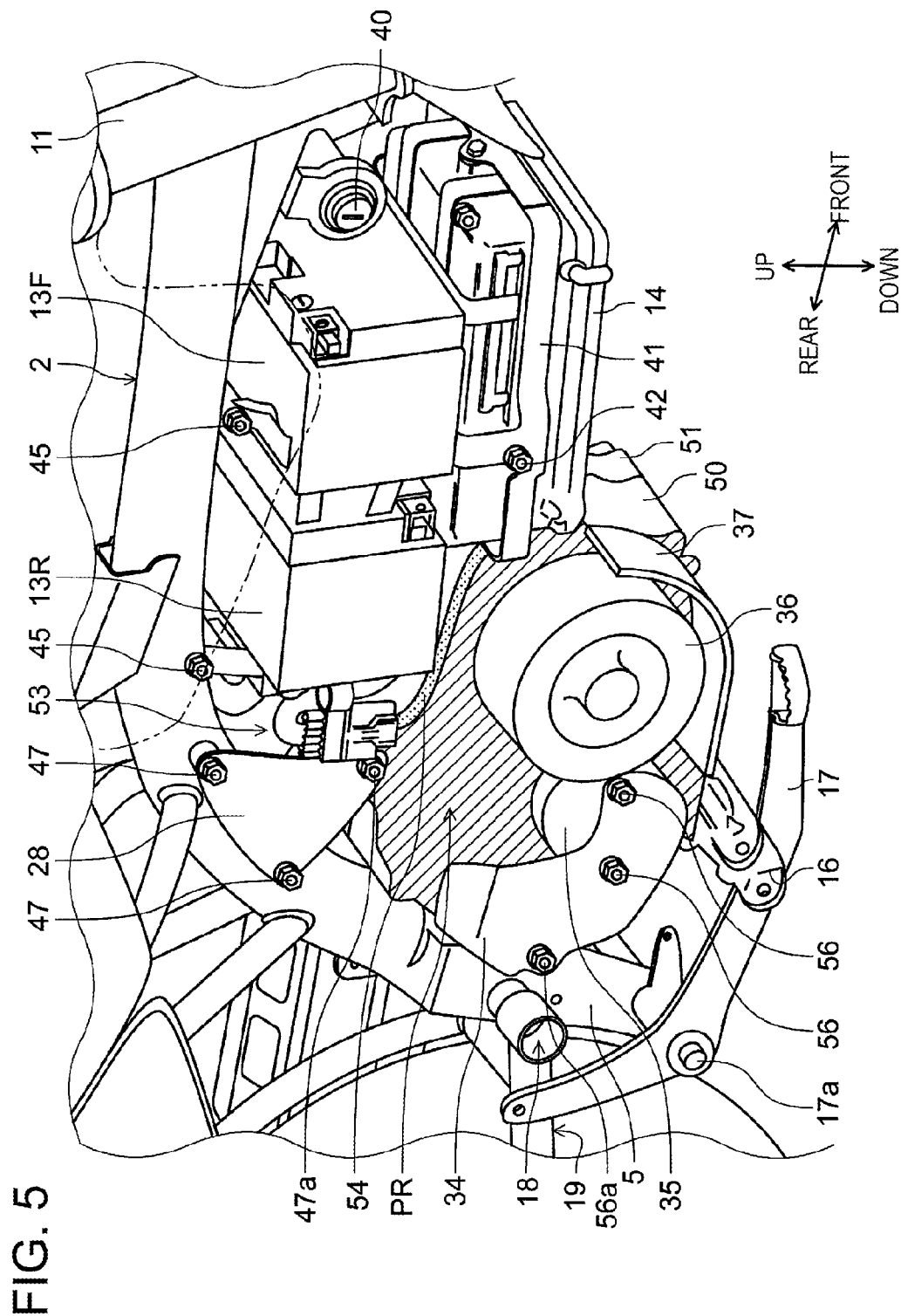
FIG. 5 is a perspective view of a periphery of a power unit viewed from the right front of a vehicle body.
Figure 6:
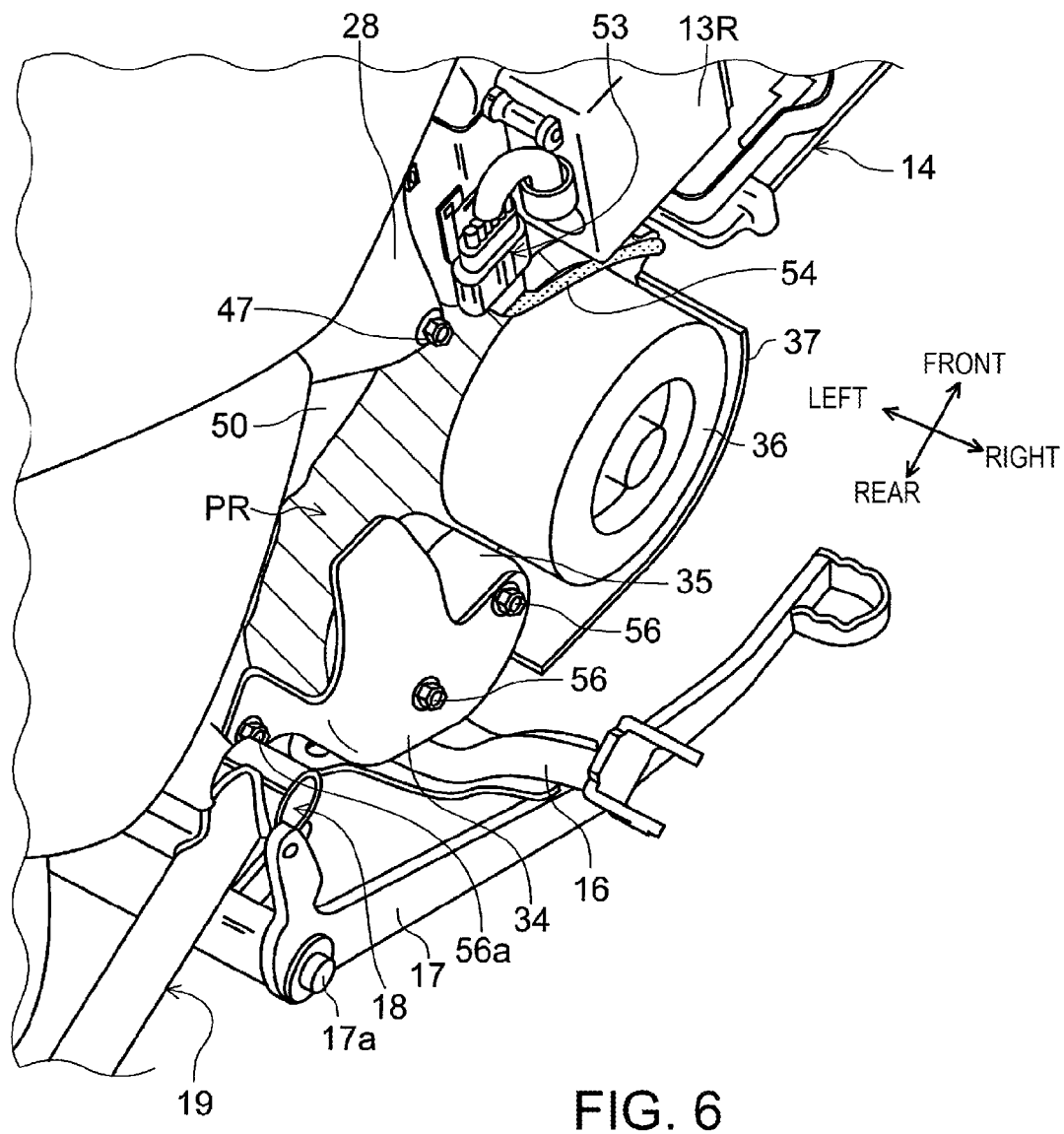
FIG. 6 is a perspective view of a periphery of the power unit viewed from the right rear of the vehicle body.

FIG. 5 is a perspective view of a periphery of the power unit P viewed from the front right of the vehicle body. FIG. 6 is the same perspective view from the right rear of the vehicle body. The power unit P is configured by mounting a clutch case 51 on the case 50 at a center in the vehicle width direction on the left side in the vehicle width direction, and mounting the motor cover 36 on the right side in the vehicle width direction. In this embodiment, by mounting the heal guard 34 on the right side surface PR of the power unit P via the motor guard 37 and the supporting base 35, protection of the motor M and an improvement of the rider comfort are achieved.

More specifically, since the revolving shaft of the motor M is oriented in the vehicle width direction in the power unit P according to the embodiment, many parts of the motor M project rightward in the vehicle width direction of the case 50. The projecting portions are covered by the bottomed cylindrical motor cover 36. Also, the motor guard 37 is configured to be mounted so as to extend upright from the right side surface PR so as to protect the motor cover 36 from the front side to the lower side with respect to the vehicle body, and to prevent stone chips from coming into contact with the motor cover 36 during the travel.

Furthermore, the heal guard 34 is capable of preventing heals placed on the footrest step 16 from entering a level difference generated between the right side surface PR and the motor cover 36, and reducing the probability of contact of stone chips with the right side surface PR. In this embodiment, the heal guard 34 is disposed so that a surface thereof becomes substantially flush with a right side surface of the motor cover 36, whereby the feet are prevented from being caught by a joint and the appearance is improved. Also, in this embodiment, since the front side of the heal guard 34 is supported by the cylindrical supporting base 35 mounted on the right side surface PR of the case 50, the rigidity of the heal guard 34 is enhanced, and the case 50 and the motor M can be protected further easily by the heal guard 34. Various modifications of the shape of the supporting base 35 of the heal guard 34 are possible and, for example, thin two column-shaped members or the like corresponding to the positions of the respective mounting screws 56 are applicable.

Figure 7:
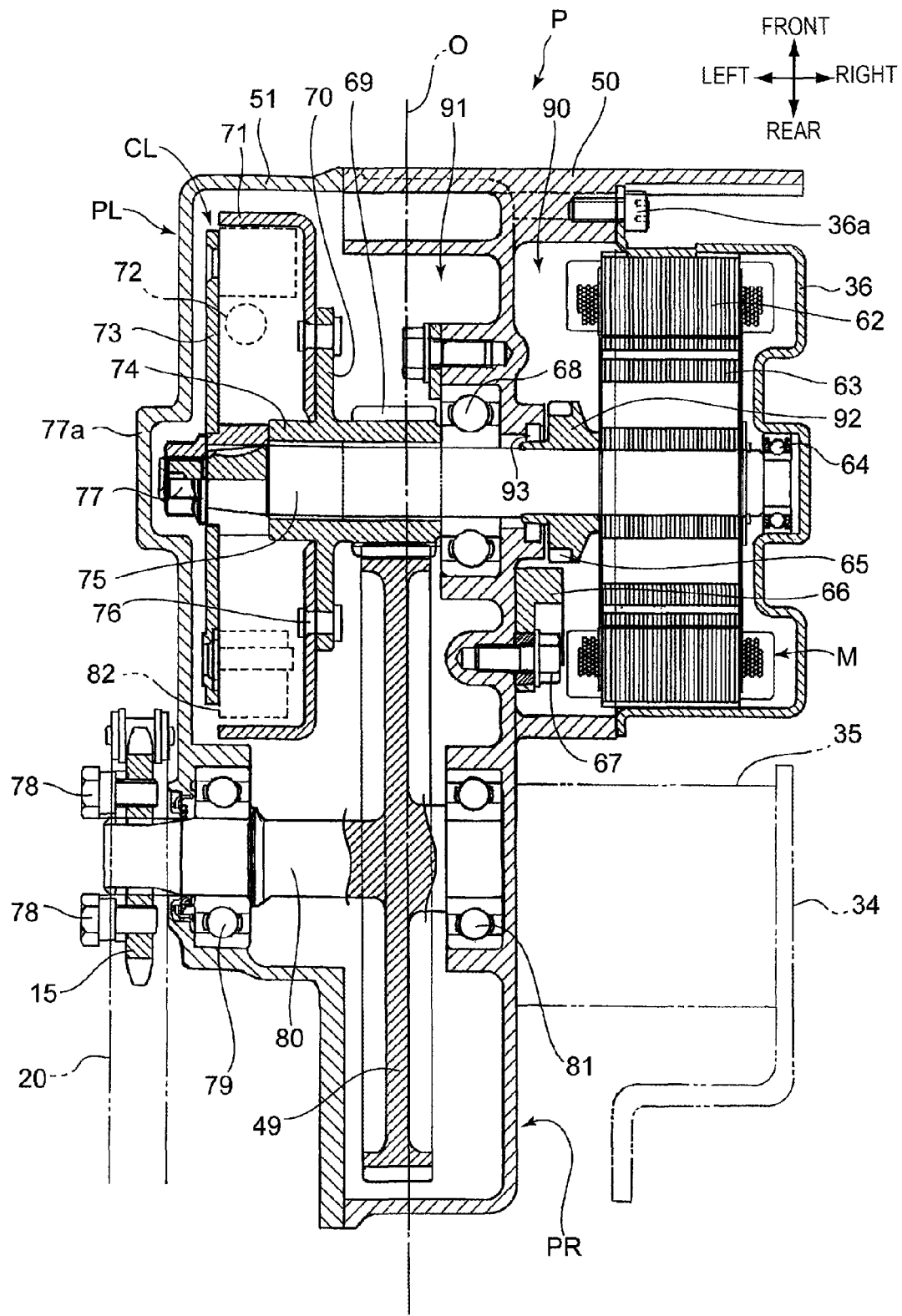
FIG. 7 is a cross-sectional view taken along the line A-A in FIG. 4.

FIG. 7 is a cross-sectional view taken along a line A-A in FIG. 4. As described above, the power unit P is configured by mounting the clutch case 51 on the case 50 at the center in the vehicle width direction on the left side in the vehicle width direction, and mounting the motor cover 36 on the right side in the vehicle width direction.

The motor M is of an inner rotor type including a rotor 63 fixed to a revolving shaft 75 and a stator 62 fixed to the case 50. The motor cover 36 is fixed to the case 50 using a plurality of mounting screws 36a so as to cover most of the cylindrical motor M. By the motor cover 36 fixed to the case 50, a motor chamber 90 for storing or receiving the motor M is formed on the right side of the power unit P in the vehicle width direction.

The revolving shaft 75 of the motor M is axially supported for rotation by a bearing 68 fitted on the left side of the case 50 in the vehicle width direction and a bearing 64 fitted to the motor cover 36. A revolving speed sensor 66 formed of a Hall element or the like is fixed to a side wall of the motor chamber 90 on the left side in the vehicle width direction with a screw 67, and a holding tool 92 configured to hold a detected body 65 formed of a magnet or the like is fixed to the revolving shaft 75 on the left side of the rotor 63 in the drawing. An annular seal member 93 is provided between the holding tool 92 and the case 50.

In contrast, with the clutch case 51 fixed to the case 50, a decelerator chamber 91 in which the centrifugal clutch CL and a decelerator mechanism are stored is formed on the left side of the power unit P in the vehicle width direction. The centrifugal clutch CL includes a clutch plate 73 configured to hold a clutch shoe 82 and a clutch outer 71 disposed so as to cover the outside of the clutch shoe 82. The disk-shaped clutch plate 73 is fixed to a left end portion of the revolving shaft 75 in the drawing using a nut 77. The clutch shoe 82 held by the clutch plate 73 is configured to move radially outward according to a centrifugal force applied on a weight 72, and comes into abutment with an inner peripheral surface of the clutch outer 71.

The clutch outer 71 is fixed to a flange portion 70 extending radially outward from a clutch outer holder 74 with a rivet 76. The clutch outer holder 74 is configured to be relatively rotatable with respect to the revolving shaft 75, and is formed with a primary drive gear 69 on the right side in the drawing. When the rotary speed of the revolving shaft 75 reaches a predetermined value and the centrifugal clutch CL is switched to the connected state, the rotary drive force is transmitted to the primary drive gear 69.

The primary driven gear 49 engaging the primary drive gear 69 is integrally formed with the output shaft 80. The output shaft 80 is axially supported for rotation by a bearing 81 fitted to the case 50 and a bearing 79 fitted to the clutch outer 71.

In the configuration described above, the primary driven gear 49 is arranged so as to be interposed between the centrifugal clutch CL and the motor M in the direction of the axis of the revolving shaft 75, and the primary driven gear can be disposed by effectively using a space between the centrifugal clutch and the motor, and hence the dimension of the power unit P in the vehicle width direction can be significantly reduced.

One end portion of the output shaft 80 projects from the clutch case 51 on the back side of the centrifugal clutch CL with respect to the vehicle body, and the drive sprocket 15 is fixed to the one end portion with a plurality of mounting bolts 78. In this embodiment, since the drive sprocket 15 is dispose as close to the vehicle center side as possible, the bearing 79 of the output shaft 80 is put inward to a position radially outside of the centrifugal clutch CL, whereby the dimension of the power unit P in the vehicle width direction can be reduced while avoiding interference between the drive sprocket 15 and the centrifugal clutch CL.

In addition, by disposing the primary drive gear 69 and the primary driven gear 49 on a vehicle body centerline O of the electric motorcycle 1, the weight balance of the power unit P in the vehicle width direction can easily be kept and proper weight balance in the vehicle width direction can easily be ensured.

Figure 8:
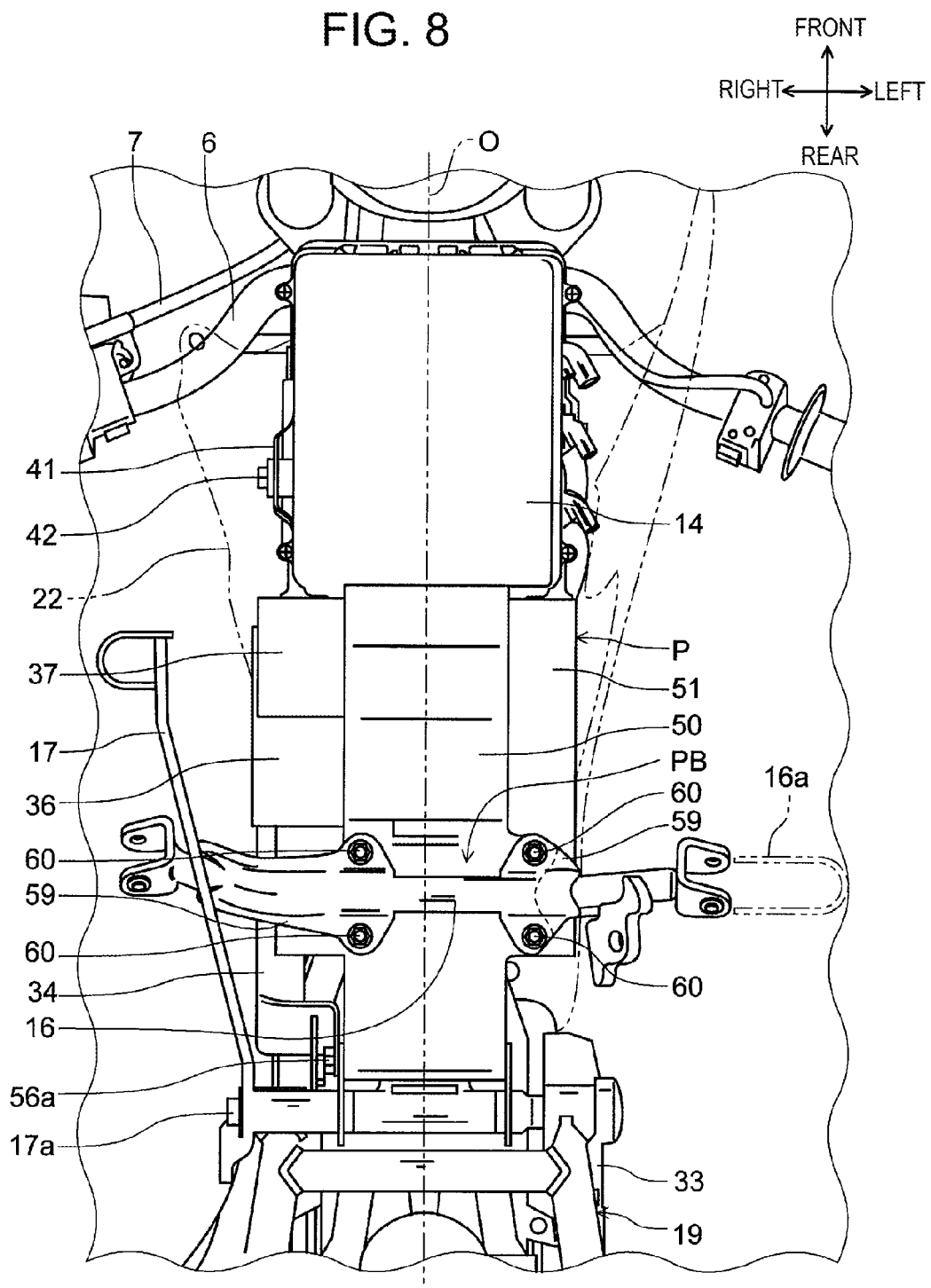
FIG. 8 is a bottom view of the electric motorcycle.

FIG. 8 is a bottom view of the electric motorcycle 1. The footrest step 16 is formed by integrally forming a pipe portion extending in the vehicle width direction and a plate-shaped base portion 59 for mounting the pipe portion on the power unit P. The footrest step 16 is fixed to the lower surface PB of the case 50 by using four mounting bolts 60 penetrating through the base portion 59. Mounted at both ends of the pipe portion of the footrest step 16 are tiltable step portions 16a.

In this embodiment, the power unit P is configured so that the dimension in the vehicle width direction thereof becomes substantially even on the left and right with respect to the vehicle body centerline O. The clutch case 51 is mounted on the left side of the case 50 in the vehicle width direction, while the motor cover 36, the motor guard 37, and the heal guard 34 are mounted on the right side in the vehicle width direction, and the weight balance in the vehicle width direction is maintained.

Figure 9:
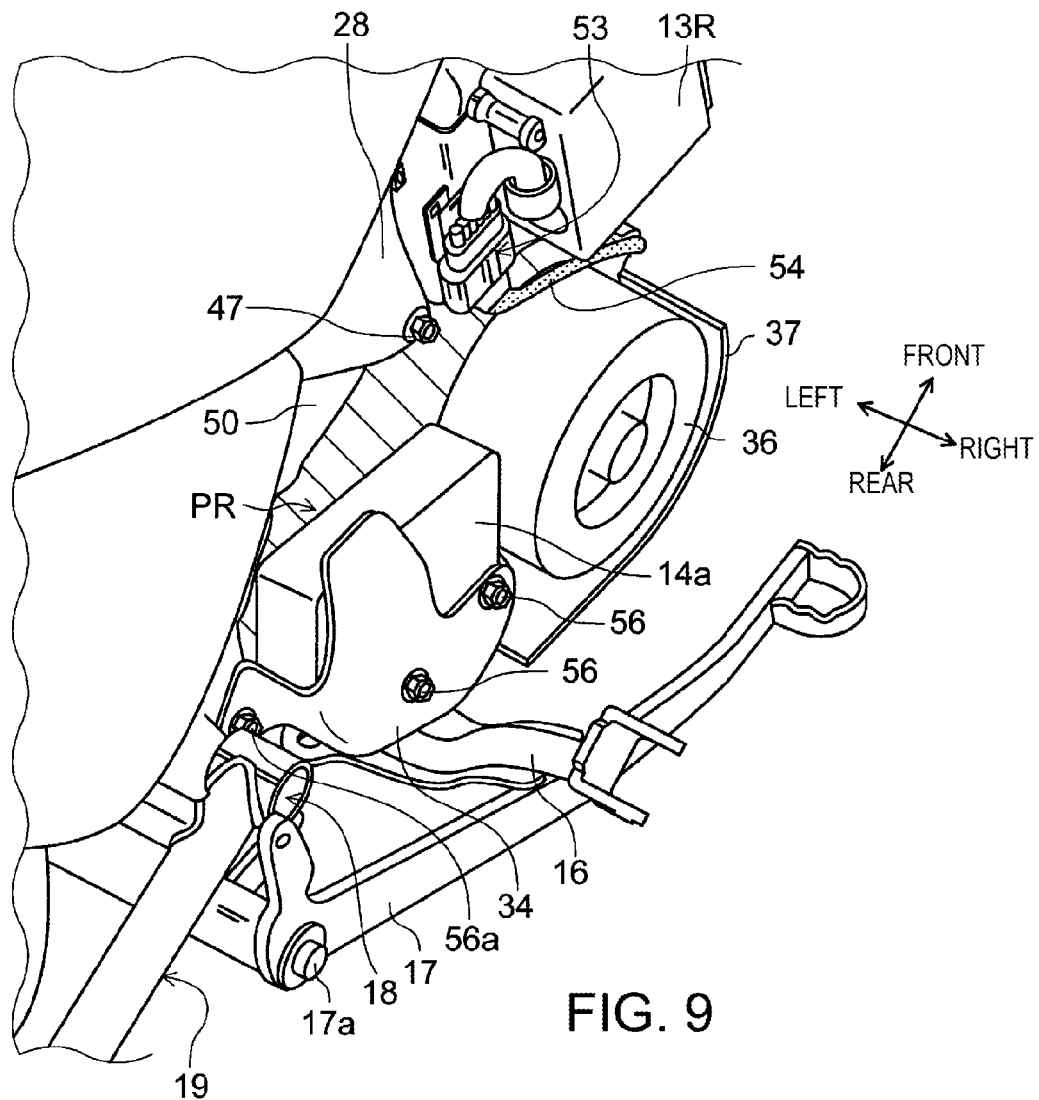
FIG. 9 is a perspective view of a power unit according to a second embodiment of the present invention viewed from the right rear of the vehicle body.

FIG. 9 is a perspective view of the power unit P according to a second embodiment of the present invention viewed from right rear direction of the vehicle body. In this embodiment, the supporting base 35 of the heal guard 34 is eliminated, and a PDU 14a is arranged in the space between the right side surface PR and the heal guard 34. The PDU 14a is fixed to the right side surface PR and the heal guard 34 is fixed to the PDU 14a using the mounting screws 56. In this configuration, the dead space can be effectively utilized and the protection of the PDU 14a by the heal guard 34 is also achieved.

The shapes of the case of the power unit, the clutch case, the motor cover, the motor guard and the heal guard, the arrangement relation between the rotational center of the motor and the rotational center of the output shaft, the shapes of the battery and the PDU, the structure of the motor and the centrifugal clutch, and the shape of the footrest step are not limited to the above-described embodiment, and various modifications are possible. The structure of the present invention described above is not limited to the electric motorcycle, and may be applied to various electric vehicles such as saddle-type three-wheeled/four-wheeled vehicles.

REFERENCE NUMERALS

1 . . . electric motorcycle, 2 . . . vehicle body frame, 13F . . . front battery, 13R . . . rear battery, 15 . . . drive sprocket, 16 . . . footrest step, 34 . . . heal guard, 35 . . . supporting base, 36 . . . motor cover, 37 . . . motor guard, 49 . . . primary driven gear, 50 . . . case, 51 . . . clutch case, 69 . . . primary drive gear, 71 . . . clutch outer, 73 . . . clutch plate, 74 . . . clutch outer holder, 75 . . . revolving shaft, 79, 81 . . . bearings, P . . . power unit, PR . . . right side surface (one side surface), PL . . . left side surface, PB . . . lower surface, CL . . . centrifugal clutch

What is claimed is:

1. An electric motorcycle comprising:
a power unit including a motor whose revolving shaft is oriented in a motorcycle width direction and a centrifugal clutch configured to transmit a rotary drive force of the motor to an output shaft, said output shaft being provided in parallel to the revolving shaft, wherein
the centrifugal clutch is coaxially arranged with the motor, and includes a primary driven gear arranged coaxially with the output shaft and configured to transmit a drive force transmitted from the centrifugal clutch to the output shaft,
the primary driven gear is disposed so as to be interposed between the centrifugal clutch and the motor in an axial direction of the revolving shaft; and,
wherein the primary driven gear is arranged so as to overlap with the centrifugal clutch in a side view of the motorcycle so that an outline thereof comes close to the revolving shaft.

2. The electric motorcycle according to claim 1, wherein a clutch plate configured to hold a clutch shoe of the centrifugal clutch is fixed to one end portion of the revolving shaft,
a bottomed cylindrical shaped clutch outer, which constitutes the centrifugal clutch, is disposed at a position closer to the motor with respect to the clutch plate,
the clutch outer is fixed to a clutch outer holder, which is relatively rotatable with respect to the revolving shaft, and
the primary driven gear engages a primary drive gear formed on an outer peripheral portion of the clutch outer holder.

3. The electric motorcycle according to claim 2, wherein the power unit has a configuration in which a clutch case is mounted on one side of a case in the motorcycle width direction, and a motor cover is mounted on the other side, and the revolving shaft is supported by a first bearing fitted to the case and a bearing fitted to the motor cover, and
the output shaft is supported by a second bearing fitted to the case and a bearing fitted to the clutch case.

4. The electric motorcycle according to claim 2, wherein the primary drive gear and the primary driven gear are disposed on a centerline of the electric motorcycle.

5. The electric motorcycle according to claim 4, wherein the power unit has a configuration in which a clutch case is mounted on one side of a case in the motorcycle width direction, and a motor cover is mounted on the other side, and the revolving shaft is supported by a first bearing fitted to the case and a bearing fitted to the motor cover, and
the output shaft is supported by a second bearing fitted to the case and a bearing fitted to the clutch case.

6. The electric motorcycle according to claim 2, wherein the output shaft is disposed so that one end portion thereof projects outward of the motorcycle from the power unit on a back side of the centrifugal clutch with respect to a motorcycle body, and a drive sprocket on which a drive chain is to be wound is fixed to the one end portion of the output shaft.

7. The electric motor according to claim 6, wherein the output shaft is supported by two bearings disposed apart from each other, and
a bearing on a side proximal to the drive sprocket, which is one of the two bearings, is disposed radially outward of the centrifugal clutch.

8. The electric motorcycle according to claim 6, wherein the power unit has a configuration in which a clutch case is mounted on one side of a case in the motorcycle width direction, and a motor cover is mounted on the other side, and the revolving shaft is supported by a first bearing fitted to the case and a bearing fitted to the motor cover, and
the output shaft is supported by a second bearing fitted to the case and a bearing fitted to the clutch case.

9. An electric motorcycle comprising:
a power unit including a motor whose revolving shaft is oriented in a motorcycle width direction and a centrifugal clutch configured to transmit a rotary drive force of the motor to an output shaft, said output shaft being provided in parallel to the revolving shaft, wherein
the centrifugal clutch is coaxially arranged with the motor, and includes a primary driven gear arranged coaxially with the output shaft and configured to transmit a drive force transmitted from the centrifugal clutch to the output shaft, the primary driven gear is disposed so as to be interposed between the centrifugal clutch and the motor in an axial direction of the revolving shaft; and, wherein the output shaft is disposed so that one end portion thereof projects outward of the motorcycle from the power unit on a back side of the centrifugal clutch with respect to a motorcycle body, and a drive sprocket on which a drive chain is to be wound is fixed to the one end portion of the output shaft.

10. The electric motor according to claim 9, wherein the output shaft is supported by two bearings disposed apart from each other, and a bearing on a side proximal to the drive sprocket, which is one of the two bearings, is disposed radially outward of the centrifugal clutch.

11. The electric motorcycle according to claim 9, wherein the power unit has a configuration in which a clutch case is mounted on one side of a case in the motorcycle width direction, and a motor cover is mounted on the other side, and the revolving shaft is supported by a first bearing fitted to the case and a bearing fitted to the motor cover, and the output shaft is supported by a second bearing fitted to the case and a bearing fitted to the clutch case.

12. An electric motorcycle comprising:

a power unit including a motor whose revolving shaft is oriented in a motorcycle width direction and a centrifugal clutch configured to transmit a rotary drive force of the motor to an output shaft, said output shaft being provided in parallel to the revolving shaft, wherein the centrifugal clutch is coaxially arranged with the motor, and includes a primary driven gear arranged coaxially with the output shaft and configured to transmit a drive force transmitted from the centrifugal clutch to the output shaft, the primary driven gear is disposed so as to be interposed between the centrifugal clutch and the motor in an axial direction of the revolving shaft; and, wherein the power unit has a configuration in which a clutch case is mounted on one side of a case in the motorcycle width direction, and a motor cover is mounted on the other side, and the revolving shaft is supported by a first bearing fitted to the case and a bearing fitted to the motor cover, and the output shaft is supported by a second bearing fitted to the case and a bearing fitted to the clutch case.

\* \* \* \* \*